United States Patent
Caudevilla et al.

(10) Patent No.: US 7,862,871 B2
(45) Date of Patent: Jan. 4, 2011

(54) PLASTIC RECEPTACLE FOR DOMESTIC WASHING MACHINES

(75) Inventors: Miguel Angel Gomez Caudevilla, Saragossa (ES); Ismael Gracia Bobed, Saragossa (ES); Alberto Mañas Molina, Saragossa (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 577 days.

(21) Appl. No.: 10/534,094

(22) PCT Filed: Jul. 8, 2003

(86) PCT No.: PCT/EP03/07345
§ 371 (c)(1),
(2), (4) Date: Nov. 21, 2005

(87) PCT Pub. No.: WO2004/042133
PCT Pub. Date: May 21, 2004

(65) Prior Publication Data
US 2006/0125150 A1    Jun. 15, 2006

(30) Foreign Application Priority Data
Nov. 6, 2002    (ES) .................................. 200202643

(51) Int. Cl.
*B29D 22/00*    (2006.01)
*D06F 21/00*    (2006.01)
*D06F 37/02*    (2006.01)

(52) U.S. Cl. .......................... 428/35.7; 68/3 R; 68/139; 68/140; 68/142; 264/478

(58) Field of Classification Search ................ 428/35.7; 264/478; 68/3 R, 139, 140, 142
See application file for complete search history.

(56) References Cited

U.S. PATENT DOCUMENTS

| | | | | |
|---|---|---|---|---|
| 3,532,402 A | * | 10/1970 | Templeton et al. | 384/557 |
| 3,581,527 A | * | 6/1971 | Smith et al. | 68/26 |
| 4,216,663 A | * | 8/1980 | Shacklock | 68/3 R |
| 4,423,540 A | * | 1/1984 | Hishida | 29/460 |
| 4,423,607 A | * | 1/1984 | Munini | 68/23.2 |
| 5,329,791 A | * | 7/1994 | Cargnel et al. | 68/24 |
| 5,373,715 A | | 12/1994 | Sharp et al. | |
| 5,433,091 A | * | 7/1995 | Durazzani et al. | 68/140 |

(Continued)

FOREIGN PATENT DOCUMENTS

| | | |
|---|---|---|
| EP | 0 219 115 A2 | 4/1987 |
| GB | 2333300 A * | 7/1999 |

OTHER PUBLICATIONS

International Search Report for PCT/EP2003/007345.

*Primary Examiner*—D. Lawrence Tarazano
*Assistant Examiner*—Michele Jacobson
(74) *Attorney, Agent, or Firm*—James E. Howard; Andre Pallapies

(57) ABSTRACT

A plastic container for domestic washing machines comprising a bearing shell (1) that accommodates a plastic member (3) in an injection moulding process, said plastic member being more solid and of better quality than the plastic forming the container (5). The metal bearing shell (1) and the plastic member (3) that is injection-moulded thereinto form a structural unit onto which the corresponding plastic container (5) is injection-moulded.

19 Claims, 4 Drawing Sheets

U.S. PATENT DOCUMENTS

| | | | |
|---|---|---|---|
| 5,526,657 A * | 6/1996 | Johnson | 68/3 R |
| 5,711,170 A | 1/1998 | Johnson | |
| 7,380,424 B2 * | 6/2008 | Kim et al. | 68/140 |
| 7,418,843 B2 * | 9/2008 | Kim et al. | 68/140 |
| 7,441,421 B2 * | 10/2008 | Kim et al. | 68/3 R |
| 7,444,841 B2 * | 11/2008 | Kim et al. | 68/12.01 |
| 7,478,546 B2 * | 1/2009 | Kim et al. | 68/3 R |
| 7,490,489 B2 * | 2/2009 | Kim et al. | 68/3 R |
| 2002/0194884 A1 * | 12/2002 | Heyder et al. | 68/140 |
| 2004/0123633 A1 * | 7/2004 | Jo | 68/23 R |
| 2004/0163428 A1 * | 8/2004 | Kim et al. | 68/140 |
| 2005/0103060 A1 * | 5/2005 | Ozturk et al. | 68/3 R |
| 2005/0138971 A1 * | 6/2005 | Ozturk et al. | 68/3 R |
| 2005/0155392 A1 * | 7/2005 | Ozturk | 68/3 R |
| 2005/0241346 A1 * | 11/2005 | Choi | 68/140 |
| 2006/0101872 A1 * | 5/2006 | Kim et al. | 68/139 |

* cited by examiner

PLASTIC RECEPTACLE FOR DOMESTIC WASHING MACHINES

SUBJECT MATTER OF THE INVENTION

The present invention relates to a plastic container for domestic washing machines, as described in the description, which has improved the same in certain aspects of design and technology to achieve new performances and solve certain problems exhibited by the present containers.

The subject matter of the invention is to improve the join between the steel bearing shell and the plastic part of the container, i.e. to improve the physical features of the washing machine container and the injection-moulding method for the same to prevent the formation of cracks, especially in the region in the vicinity of the corresponding bearing housing or the bearing shell provided to mount the axis of the rotary drum of the washing machine.

GENERAL PRIOR ART

It is known that, in addition to other components, washing machines comprise a container in whose interior the rotary drum to receive the load is attached in such a way that the axis of the same is mounted on metal bearings arranged on a bearing shell which is arranged for this purpose in a cavity of the container.

In addition, it is known that the plastic containers are obtained by injection moulding such that first the bearing housing or the bearing shell is arranged in the mould of the injection moulding machine and the injection moulding itself takes place thereafter.

This injection moulding method has a number of problems and disadvantages which are derived from the following:
- Differences in the shrinkage coefficients of the materials since a metal bearing shell is involved on the one hand and a plastic container on the other hand.
- Different cooling curves which are also caused by the different nature of the materials.
- Different mass ratio likewise caused by the different nature of the materials.

As a result of these differences which appear during the injection moulding process, micro-gaps are formed between the plastic and steel material and consequently a poor join between the materials, which gives rise to a weakening of the container and consequently to the possible formation of cracks at those points where the micro-gaps or points of weakening develop.

The problems described hereinbefore yield a further problem whereby an intermediate space is formed at the housing of the sleeve seal, resulting in movement of the same and causing filtration of water via the bearing housing or the bearing shell.

An attempt is now made to solve these problems by means of direct injection moulding of the washing machine container onto the bearing shell although the injection moulding method is not optimal, regardless of the fact that since the container is still made of generally poor-quality plastic, damage occurs at high motor speed.

DESCRIPTION OF THE INVENTION

The container forming the subject matter of the invention was invented to solve the problems and disadvantages described previously using an inexpensive solution which prevents the formation of cracks in the container and imparts better physical properties to said container since a better join is achieved between the bearing shell and the plastic part of the container.

Specifically, the novelty of the invention comprises a plastic container for domestic washing machines which internally receives a rotary drum whose axes are mounted on bearings provided in a bearing shell made of metallic material, characterised in that at least one plastic member is received around the structural unit formed by the bearing shell and the plastic member before the remainder of the plastic container is injection-moulded.

In a preferred embodiment at least one plastic member is used around the bearing shell in an injection-moulding method which differs from the injection moulding method of the remainder of the plastic container and allows the structural unit comprising the shell and plastic part to cool down in order to carry out a second injection moulding without heating the bearing shell since, in the presence of different shrinkage coefficients and temperature gradients, the join is stronger with a first independent plastic injection moulding.

In another advantageous embodiment, the material of at least one of the plastic members differs from the material of the remainder of the plastic container, and also the material of at least one of the plastic members is of a higher strength and quality than that of the remainder of the container since a better-quality plastic is required at this critical joining point to the bearing shell. However, the remainder of the container can consist of a cheaper material since it need not withstand such stresses.

In another embodiment of the invention, the plastic member that is injection-moulded onto the bearing shell forms an envelope or insert which is provided with external reinforcing ribs or webs which impart a greater strength to the joining regions to the container since this is obtained by injection moulding around the structural unit formed by the bearing shell with its envelope or insert.

The plastic member in the form of an envelope or insert can cover the entire side surface of the bearing shell and the attachment area of the sleeve seal of the same to obtain a complete join to the shell.

In another embodiment, the plastic member that is injection-moulded onto the bearing shell, forms a ring which surrounds the attachment of the bearing shell and the attachment area and a section of the side surface of the bearing shell.

The ring can have any variable configuration which makes it possible to achieve different forms of connection to the structural unit comprising the bearing shell and the plastic container.

With the aid of the features which have been specified, the physical features of the container and the injection moulding method itself are improved, whereby the micro-gaps between the plastic material of the container and the steel material of the bearing shell are reduced whilst at the same time, the adhesion or cohesion between the materials is improved and correct thermal insulation of the bearing shell during the final injection moulding of the container is naturally achieved.

A dimensional improvement and smaller deviation in the area of the sleeve seal of the bearing shell is also achieved by using better-quality materials.

Finally, it remains to be said that among the features that have been cited, an increase in the reinforcement of the container sections which withstands the most loading and a dimensional improvement in the web thicknesses is achieved.

To sum up, the advantages derived from the plastic container for domestic washing machines according to the subject matter of the invention, can be summarised as follows:

Better injection moulding method,

Cracks are prevented in the area of the container in the vicinity of the bearing container on which the axis of the rotary drum of the washing machine is mounted.

Better mounting of the sleeve seal.

The container can be made of a low-quality plastic such as polypropylene with talc and can withstand a high speed during rotation of the drum and this is because the plastic member which is injection-moulded onto the bearing shell is made of a harder, better-quality material than the plastic material forming the container.

BRIEF DESCRIPTION OF THE DRAWINGS

To complement the following description and help provide a better understanding of the features of the invention, a set of drawings is enclosed with the present specification on which basis the novelties and advantages of the plastic container for domestic washing machines according to the subject matter of the invention are easier to understand. In the drawings.

DESCRIPTION OF THE PREFERRED EMBODIMENT

Figure 1:
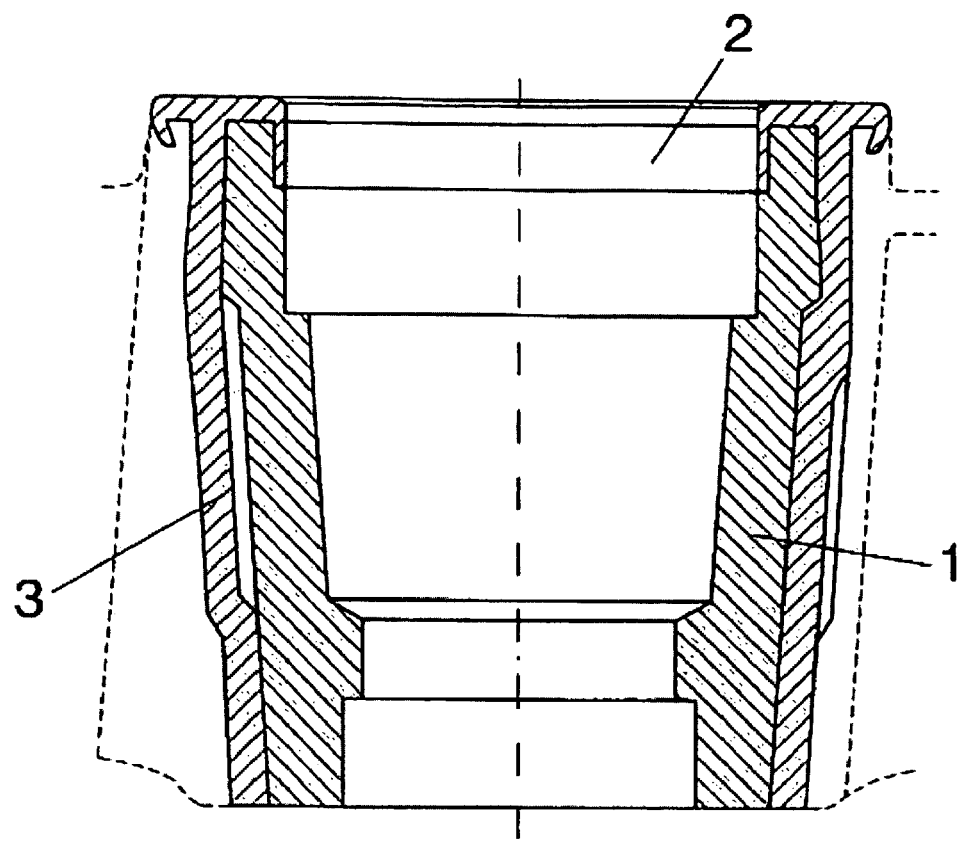
FIG. 1 is a sectional view of a bearing shell suitable for a plastic container of a washing machine, wherein the bearing shell receives the plastic member and in this case forms an envelope having high strength and good quality.
Figure 2:
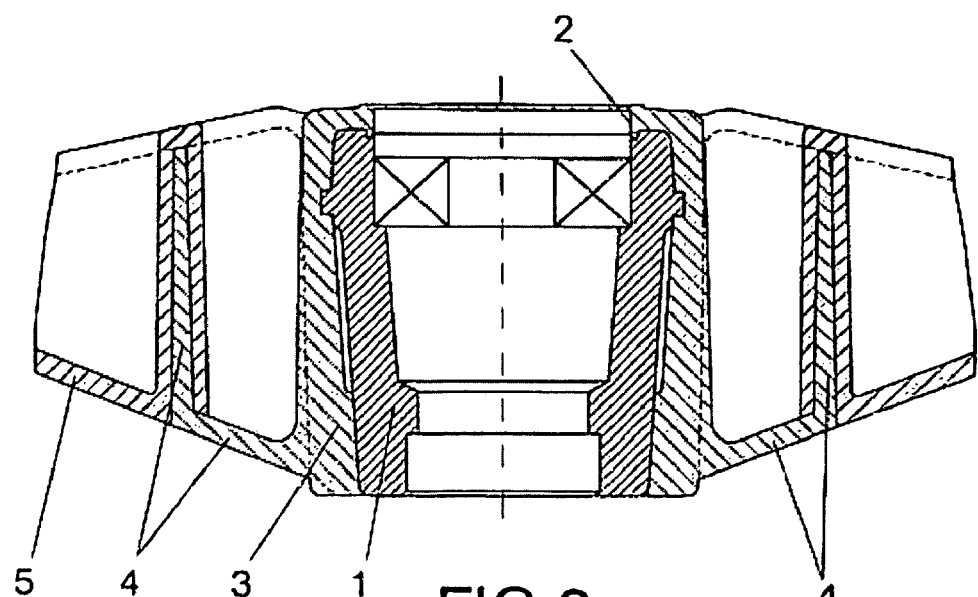
FIG. 2 is a sectional view of the practical application of the subject matter of the invention wherein the structural unit according to FIG. 1 can be seen with the webs of the plastic member which facilitate better cohesion between the materials forming the container when this is injection-moulded around the plastic member which is formed in this case by an envelope with the webs.
Figure 3:
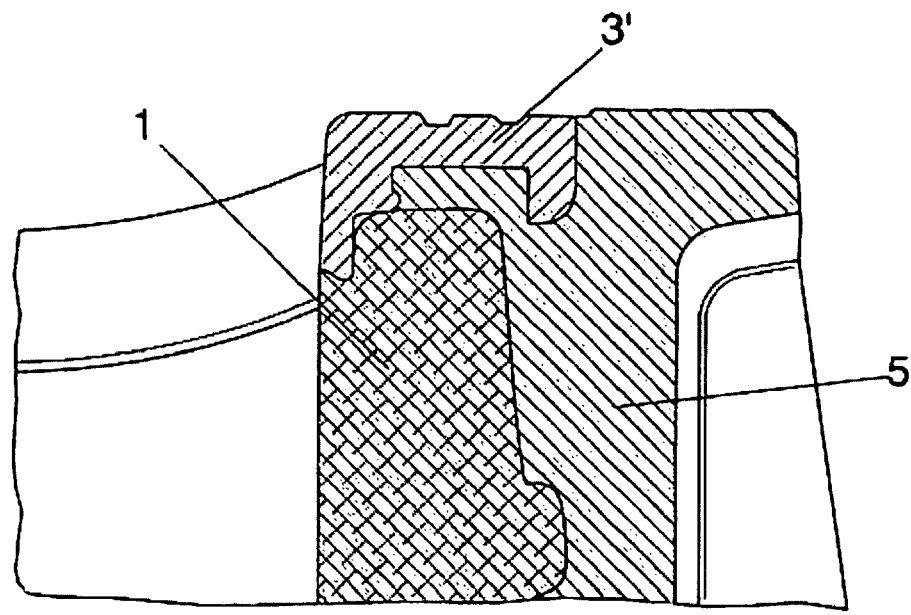
FIG. 3 is a detail of an embodiment in which the plastic member injection-moulded onto the bearing shell is a ring, both members forming a structural unit onto which the plastic container is injection moulded.
Figure 4:
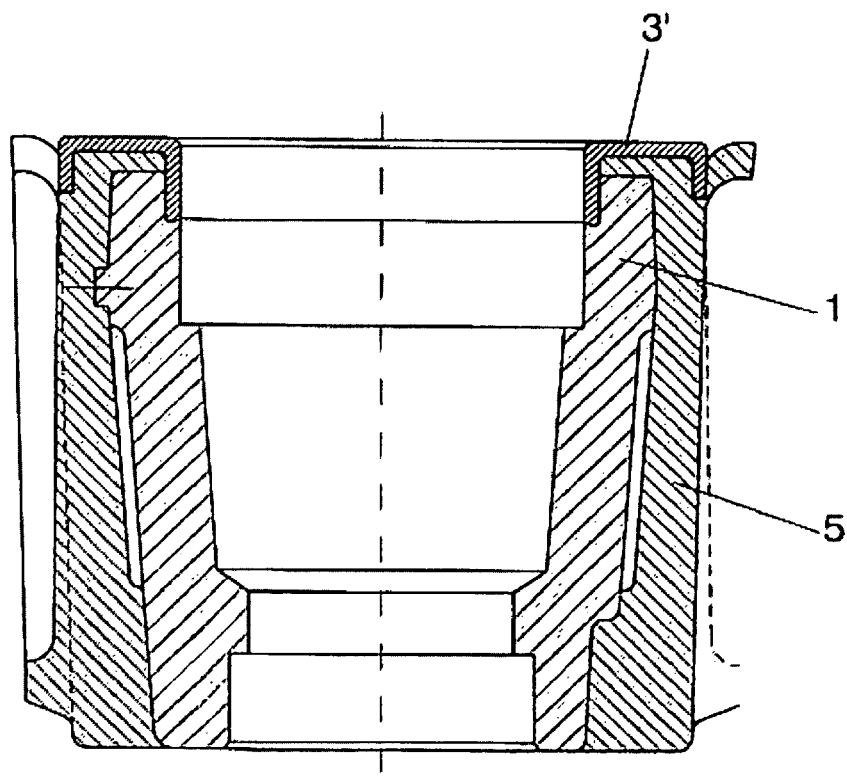
FIG. 4 is a longitudinal sectional view of an exemplary embodiment in which the plastic member, constructed as a ring, is attached on the attachment specified by the bearing shell and the plastic container, said plastic container being injection moulded around the structural unit formed by the ring and the bearing shell.
Figure 5:
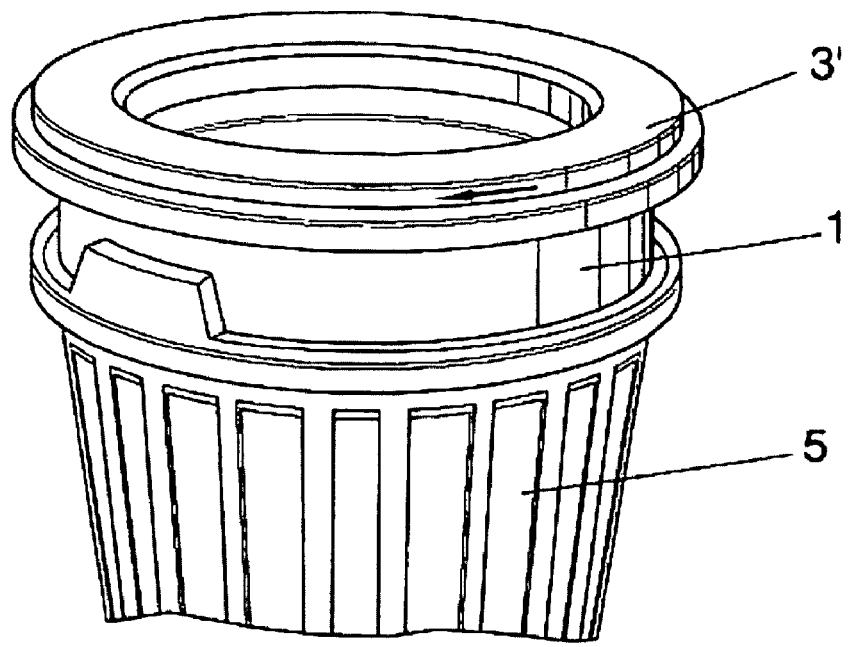
FIG. 5 is a perspective view of the ring forming the plastic member which is injection moulded onto the bearing shell and of the same arranged on the corresponding plastic container, and FIGS. 6 and 7 each show details in sectional view of two variants for attachment of the ring forming the plastic member which is injection moulded onto the bearing shell.
Figure 6:
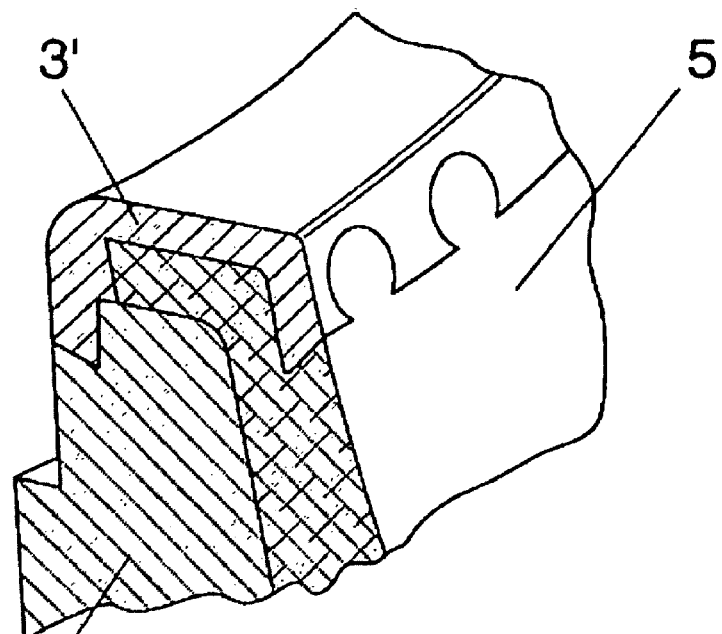
Figure 7:
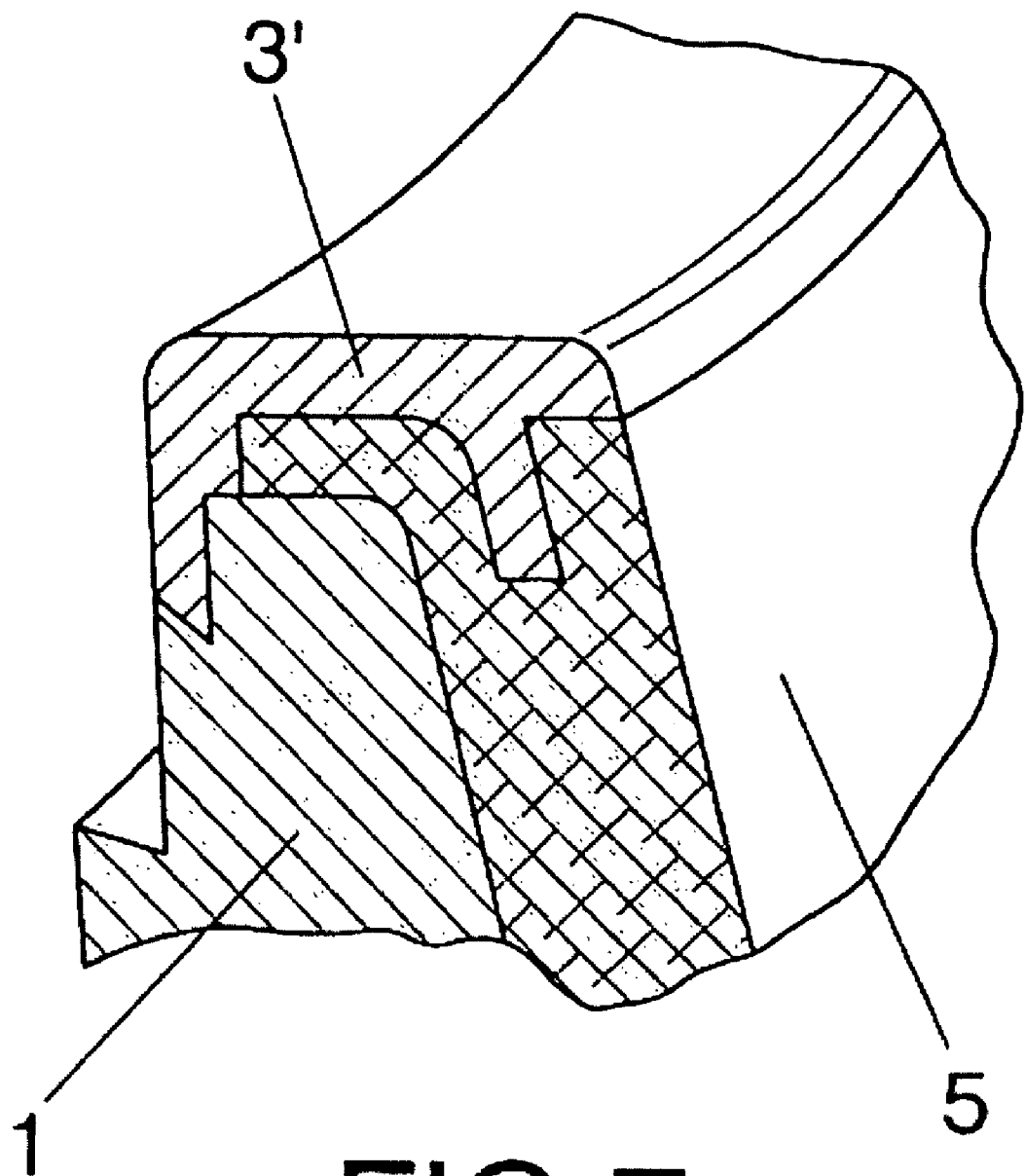

FIGS. 1 and 2 show a bearing shell 1 which consists of steel as usual and is provided with a sleeve seal area 2 that is in the form of a sleeve seal area, wherein a plastic member 3 is injection-moulded onto the bearing shell 1, said plastic member forming an insert or an envelope in the embodiment according to FIG. 1 and 2, which covers the entire side surface of the bearing shell 1, including the attachment of the same and an inner section of the area of the attachment 2.

The plastic member 3 is provided with reinforcing ribs 4 or webs which form a component of the outer surface of the envelope forming the plastic member 3, as shown in FIG. 2. so that the plastic material forming the corresponding container 5 acquires a greater cohesion or adhesion with the member 3 during its injection moulding, whereby a greater reinforcement is provided in this area of the container 5 which is logically situated near the bearing shell 1 where the container has to withstand the greatest loading.

In one embodiment, the plastic member 3 can be formed by a simple ring 3' having different forms and shapes, as shown in FIGS. 3 to 7 since the plastic member, whether this now forms an envelope 3 according to FIGS. 1 and 2 or a ring 3', can have any form or shape since what is important is that the plastic member 3 or 3' together with the bearing shell 1 and the plastic container 5 is injection moulded onto the structural unit formed by both members.

Finally, it remains to be said that the plastic member 3 or 3' which is injection-moulded onto the bearing shell 1 is of greater strength and better quality than the plastic forming the container 5 so that the member 3 or 3' which is injection moulded in association with the critical area of the container 5 thereby provides a greater strength in this area and thus prevents cracks which occur very frequently in conventional plastic containers since the material of the same is of lower quality.

The invention claimed is:

1. A plastic container for domestic washing machines which internally receives a rotary drum whose axis is mounted on bearings arranged in a bearing shell made of metallic material, wherein a plastic member is accommodated on at least one section of a surface of the bearing shell, with the plastic member and the bearing shell together forming a structural unit, before the remainder of the plastic container is injection-molded onto the structural unit formed by the bearing shell and the plastic member, and the material of the plastic member differs from the material of the remainder of the plastic container.

2. The plastic container according to claim 1, wherein the plastic member covers a portion of an inside surface of the bearing shell.

3. The plastic container according to claim 2, wherein the plastic member is formed with a plurality of ribs.

4. The plastic container according to claim 2, wherein the plastic member covers an entire outside surface of the bearing shell.

5. The plastic container according to claim 1, wherein the at least one section of the surface of the bearing shell is a first portion of an outside surface of the bearing shell, the plastic member is a ring which surrounds the at least one section of the surface of the bearing shell, and a second portion of the outside surface of the bearing shell is contacted by the remainder of the plastic container.

6. A container for a washing machine having a rotary drum disposed within the container and being mounted for rotation with respect to the container, the container being for retaining liquids during operation of the washing machine, the container comprising:

a bearing shell for receiving at least one bearing, the bearing shell having a substantially cylindrical shape;

a plastic member formed on the bearing shell; and a container body being formed on the plastic member, wherein the plastic member is made from a first plastic material and the container body is made from a second plastic material different than the first plastic material.

7. The plastic container according to claim 6, wherein the plastic member includes at least one projection extending into the container body to form an interlocking engagement with the container body.

8. The plastic container according to claim 6, wherein the first plastic material has higher hardness and strength characteristics than the second plastic material.

9. The plastic container according to claim 6, wherein the bearing shell is made from a metal material.

10. The plastic container according to claim 6, wherein the plastic member is formed directly on the bearing shell with a first injection molding process and the container body is formed directly on the plastic member with a second injection molding process.

11. A method for making a container for retaining liquids within a washing machine having a rotary drum mounted for rotation with respect to the container, the method comprising the following steps:
provinding a bearing shell for receiving at least one bearing, the bearing shell comprised of metallic material;
forming a plastic member on the bearing shell by a first injection molding process, the plastic member and the bearing shell together forming an intermediate structure, the plastic member being a portion of the container; and
then applying a container body formed on the intermediate structure by a second injection molding process,
wherein the plastic member is formed from a first plastic material and the container body is formed from a second plastic material different than the first plastic material.

12. The method according to claim 11, further comprising forming at least one projection extending from the plastic member and into the container body to form an interlocking engagement between the plastic member and the container body.

13. The method according to claim 11, wherein the first plastic material has higher hardness and strength characteristics than the second plastic material.

14. A method for making a container for retaining liquids within a washing machine having a rotary drum mounted for rotation with respect to the container, the method comprising:
providing a bearing shell for receiving at least one bearing, the bearing shell comprised of metallic material;
applying a plastic member on the bearing shell via a first injection molding process, the plastic member and the bearing shell together forming an intermediate structure and the plastic member being a portion of the container; and
after the plastic member applied on the bearing shell has at least partially cured following the step of applying the plastic member, forming the remainder of the container on the intermediate structure with a second injection molding process,
wherein the plastic member is formed from a first plastic material and the remainder of the container is formed from a second plastic material different than the first plastic material.

15. The plastic container according to claim 1, wherein the remainder of the container is injection-molded onto the structural unit formed by the bearing shell and the plastic member only after the plastic member has been applied to the bearing shell by an injection molding process and allowed to at least partially cure.

16. The plastic container according to claim 1, wherein the bearing shell is adapted to receive the bearings after the remainder of the plastic container is injection molded onto the structural unit.

17. The container according to claim 6, wherein the bearing shell is adapted to receive the at least one bearing after the container body is formed on the plastic member.

18. The method according to claim 11, wherein the bearing shell is adapted to receive the at least one bearing after the container body is formed on the plastic member.

19. The method according to claim 14, wherein the bearing shell is adapted to receive the at least one bearing after the remainder of the container is formed on the intermediate structure.

* * * * *